(12) United States Patent
Cass et al.

(10) Patent No.: US 10,745,104 B2
(45) Date of Patent: Aug. 18, 2020

(54) STRINGER TRANSITION THROUGH A COMMON BASE CHARGE

(71) Applicant: The Boeing Company, Chicago, IL (US)

(72) Inventors: Gregory A. Cass, Seattle, WA (US); Garrett C. Hanson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 15/910,242

(22) Filed: Mar. 2, 2018

(65) Prior Publication Data

US 2019/0270508 A1 Sep. 5, 2019

(51) Int. Cl.
| | | |
|---|---|---|
| *B64C 3/18* | (2006.01) | |
| *B64F 5/10* | (2017.01) | |
| *B64C 3/26* | (2006.01) | |
| *B64C 1/12* | (2006.01) | |
| *B64C 1/06* | (2006.01) | |

(52) U.S. Cl.
CPC .............. *B64C 3/182* (2013.01); *B64C 1/064* (2013.01); *B64C 1/12* (2013.01); *B64C 3/26* (2013.01); *B64F 5/10* (2017.01)

(58) Field of Classification Search
CPC .......... B64C 3/182; B64C 3/18; B64C 1/064; B64C 1/12; B64C 3/26; B64F 5/10
USPC ....................................................... 244/123.3
See application file for complete search history.

(56) References Cited

U.S. PATENT DOCUMENTS

| | | | | | |
|---|---|---|---|---|---|
| 4,715,560 A | * | 12/1987 | Loyek | ..................... | B29C 70/24 244/117 R |
| 4,741,943 A | * | 5/1988 | Hunt | ........................ | B64C 3/20 156/156 |
| 7,681,835 B2 | * | 3/2010 | Simpson | ................... | B64C 3/20 244/123.14 |

(Continued)

FOREIGN PATENT DOCUMENTS

| | | | | | |
|---|---|---|---|---|---|
| CA | 2804837 A1 | * | 10/2013 | ............. | B64C 3/182 |
| CA | 2917127 A1 | * | 1/2015 | ............. | B64C 3/182 |

(Continued)

OTHER PUBLICATIONS

Extended European Search Report dated Jul. 8, 2019, issued in co-pending European Patent Application No. 19152578.1.

*Primary Examiner* — Christopher P Ellis
(74) *Attorney, Agent, or Firm* — Joseph M. Rolnicki; Evans & Dixon, L.L.C.

(57) ABSTRACT

The construction of a stringer transition through a common base eliminates the need for plate fittings and their associated fasteners to connect opposing ends of a first stringer having a large cross-sectional area to a second stringer having a smaller cross-sectional area. A base of composite material is secured to a skin panel of an aircraft wing with the base aligned with and extending along the longitudinal length of the skin panel. The first stringer is secured to the base and the second stringer is secured to the base, with the first stringer and second stringer longitudinally aligned with the base and with a longitudinal spacing between the first stringer and the second stringer. The base connects the first stringer to the second stringer and only the base connects the first stringer to the second stringer.

20 Claims, 14 Drawing Sheets

(56) References Cited

U.S. PATENT DOCUMENTS

| | | | |
|---|---|---|---|
| 9,010,689 B1 * | 4/2015 | Brook | B64D 37/32 |
| | | | 244/135 R |
| 9,987,823 B2 * | 6/2018 | Eli Eli | B29C 70/22 |
| 2010/0304094 A1 * | 12/2010 | Brook | B29C 70/30 |
| | | | 428/174 |
| 2011/0284693 A1 * | 11/2011 | Barnard | B64C 1/064 |
| | | | 244/132 |
| 2012/0234978 A1 * | 9/2012 | Hernando Navas | B64C 3/26 |
| | | | 244/132 |
| 2014/0120302 A1 * | 5/2014 | Arana Hidalgo | B64C 1/064 |
| | | | 428/113 |
| 2015/0014484 A1 * | 1/2015 | Zeon | B64C 1/26 |
| | | | 244/131 |
| 2015/0053818 A1 * | 2/2015 | Charles | B64C 3/187 |
| | | | 244/124 |
| 2015/0183503 A1 * | 7/2015 | Miguez Charines | B29C 70/34 |
| | | | 244/133 |
| 2017/0008611 A1 * | 1/2017 | Murta | B64C 3/185 |
| 2017/0369149 A1 * | 12/2017 | Walker | B64C 3/26 |
| 2018/0015996 A1 * | 1/2018 | Shemkunas | B64C 23/065 |
| 2018/0050787 A1 * | 2/2018 | Kismarton | B64F 5/10 |
| 2018/0050788 A1 * | 2/2018 | Kismarton | B64C 3/185 |
| 2018/0072399 A1 * | 3/2018 | Walker | B64C 3/187 |
| 2018/0117841 A1 * | 5/2018 | Tyler | B64C 3/20 |
| 2018/0297299 A1 * | 10/2018 | Caron | B64C 1/12 |
| 2019/0263496 A1 * | 8/2019 | Cheng | B32B 5/12 |

FOREIGN PATENT DOCUMENTS

| | | | | |
|---|---|---|---|---|
| CA | 2864310 A1 * | 4/2015 | | B64C 3/182 |
| CA | 2911133 A1 * | 7/2016 | | B64C 3/182 |
| CA | 2995637 A1 * | 11/2018 | | B64C 3/187 |
| EP | 2700574 A1 | 2/2014 | | |
| EP | 2727821 A1 | 5/2014 | | |
| EP | 2824031 A2 | 1/2015 | | |
| EP | 2824031 A3 | 4/2015 | | |
| EP | 2942269 A1 | 11/2015 | | |
| WO | WO2015073073 | 5/2015 | | |

* cited by examiner

STRINGER TRANSITION THROUGH A COMMON BASE CHARGE

FIELD

This disclosure pertains to an aircraft structure, for example an aircraft wing that is constructed of composite materials and is reinforced by stringers that extend through the length of the wing. As the stringers extend through the length of the wing, their cross-section configurations change due to the decreasing interior area of the wing as the wing extends from its inboard end to its outboard end.

BACKGROUND

In a typical construction of an aircraft wing, a rib box is formed in an interior of the wing. The rib box extends along the longitudinal length of the wing between an inboard end of the wing and an opposite outboard end of the wing. The rib box is positioned laterally between a forward or leading edge of the wing and a rearward or trailing edge of the wing.

The rib box contains a plurality of ribs that extend laterally between a forward spar of the rib box and a rearward spar of the rib box. The plurality of ribs are longitudinally, spatially arranged along the longitudinal length of the wing box. The wing box construction also includes pluralities of stringers that extend longitudinally across the top and bottom of the wing box. The stringers are elongate, narrow reinforcing members that extend along the longitudinal length of the wing box and are secured to the ribs in reinforcing the wing box. The stringers are also connected to the top exterior skin panel of the wing and the bottom exterior skin panel of the wing.

Because the typical aircraft wing tapers as it extends from its inboard end to its outboard end, the interior volume of the wing box decreases as the wing box extends from its inboard end to its outboard end. With the interior volume of the wing box decreasing as the wing box extends from its inboard end to its outboard end, there is decreasing space in the wing box between the front spar and rear spar of the wing box for the stringers. This requires that, at some point along the longitudinal length of the wing box, each stringer must either run out or terminate, or transition from a first cross-sectional area of the stringer to a second cross-sectional area of the stringer, where the second cross-sectional area is smaller than the first cross-sectional area. This typically requires a first stringer having the first cross-sectional area terminating and then beginning again as the second stringer with the second cross-sectional area. The first stringer is connected end to end with the second stringer.

When a stringer transitions from a larger, first cross-sectional area stringer to a smaller, second cross-sectional area stringer, it is necessary that the first stringer and the second stringer be connected end to end. This connection is typically provided by plate fittings that are connected between the opposing ends of the first stringer and the second stringer. For example, where the first stringer and the second stringer have "I" configurations, a plate fitting is attached between the webs of the opposing ends of the first stringer and second stringer, and plate fittings are attached between the top flange and bottom flange of the opposing ends of the first stringer and second stringer. The material typically used to construct the plate fittings is titanium. The titanium plate fittings are attached between the opposing ends of the first stringer and the second stringer by pluralities of fasteners.

The use of the titanium plate fittings and the pluralities of fasteners to connect opposing ends of a first stringer and a second stringer add substantially to the construction time of the wing box. Additionally, the use of the titanium plate fittings and the fasteners to connect opposing ends of a first stringer and a second stringer adds substantially to the weight of the wing box. The use of the titanium plate fittings and the fasteners also adds substantially to the cost of constructing the wing box.

SUMMARY

The aircraft structure, or the aircraft wing of this disclosure is constructed with a skin panel that extends the longitudinal length of the wing. The skin panel has an exterior surface and an opposite interior surface. The exterior surface of the skin panel forms an exterior surface of the wing that is exposed to the exterior environment of the wing. The exterior surface of the wing can be a top surface of the wing or a bottom surface of the wing. The longitudinal length of the skin panel extends between an inboard edge of the skin panel and an opposite outboard edge of the skin panel. The skin panel has a lateral width that extends between a forward edge of the skin panel and an opposite rearward edge of the skin panel.

A base is secured to the interior surface of the skin panel. The base has an elongate, generally rectangular and generally planar configuration. The base has an exterior surface and an opposite interior surface. The base has a longitudinal length that extends between an inboard edge of the base and an opposite outboard edge of the base. The base has a lateral width that extends between a forward edge of the base and an opposite rearward edge of the base. The exterior surface of the base is secured to the interior surface of the skin panel with the longitudinal length of the base aligned with and extending along the longitudinal length of the skin panel.

A first stringer having a first cross section area, for example a hat stringer is secured to the interior surface of the base. The first stringer has an exterior surface and an opposite interior surface. The first stringer has a longitudinal length that extends between an inboard end of the first stringer and an opposite outboard end of the first stringer. The first stringer has a lateral width that extends between a forward edge of the first stringer and an opposite rearward edge of the first stringer. The exterior surface of the first stringer is secured to the interior surface of the base with the longitudinal length of the first stringer aligned with and extending along a portion of the longitudinal length of the base.

A second stringer having a second cross section area, for example a blade stringer is also secured to the interior surface of the base. The second stringer has an exterior surface and an opposite interior surface. The second stringer also has a longitudinal length that extends between an inboard end of the second stringer and an opposite outboard end of the second stringer. The second stringer has a lateral width that extends between a forward edge of the second stringer and an opposite rearward edge of the second stringer. The exterior surface of the second stringer is also secured to the interior surface of the base with the longitudinal length of the second stringer aligned with the longitudinal length of the first stringer, and with the longitudinal length of the second stringer aligned with and extending along a portion of the longitudinal length of the base.

There is a longitudinal spacing between the first stringer and the second stringer. No fittings, for example titanium fittings are employed to span across the longitudinal spacing between the first stringer and the second stringer and connect the first stringer and the second stringer. Instead, the base connects the first stringer to the second stringer and only the base connects the first stringer to the second stringer.

The construction of the stringer transition eliminates the need for titanium plate fittings and their associated fasteners to connect opposing ends of a first stringer having a large cross-sectional area to a second stringer having a smaller cross-sectional area. Additionally, the stringer transition construction eliminates the need for titanium plate fittings and their associated fasteners to connect a first stringer having a large lateral width to a second stringer having a smaller lateral width. The connection between the opposing ends of the first stringer and the second stringer at the transition is provided solely by the base.

The features, functions and advantages that have been discussed can be achieved independently in various embodiments or may be combined in yet other embodiments, further details of which can be seen with reference to the following description and drawings.

DETAILED DESCRIPTION

Figure 1:
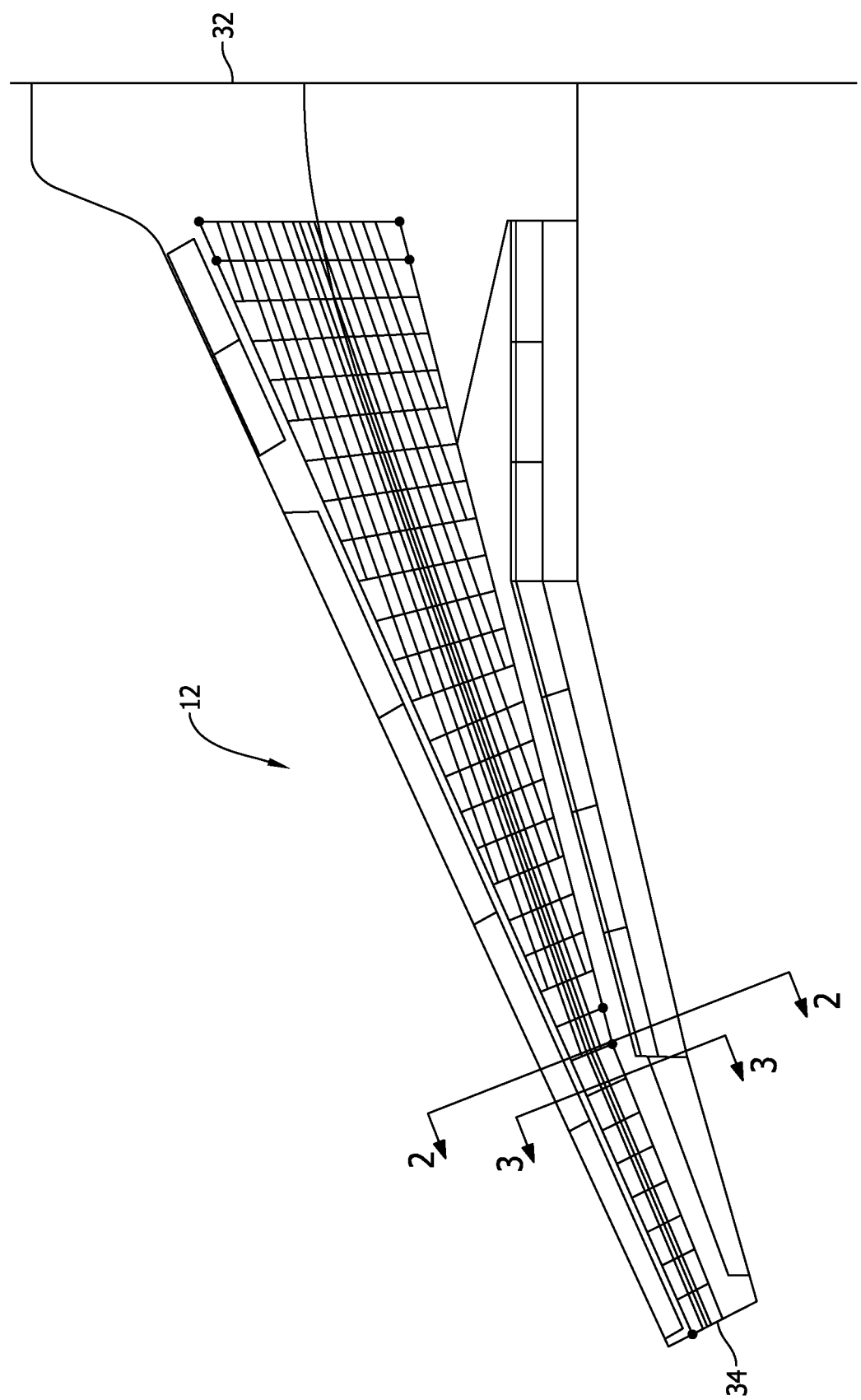
FIG. 1 is a schematic representation of an aircraft wing employing the stringer transition through a common base charge of this disclosure.

The aircraft structure that is the subject of this disclosure that employs several stringer transitions through a common base is represented in FIG. 1. The aircraft structure 12 is represented as an aircraft wing in FIG. 1. However, the concepts of this disclosure of the stringer transition through a common base can be employed in various different types of aircraft structures. The stringer transition through the common base is comprised of component parts that are constructed from composite materials. More specifically, the component parts are constructed of pre-preg, fiber reinforced composite materials. Other equivalent types of materials could be used in the stringer transition through the common base.

Figure 2:
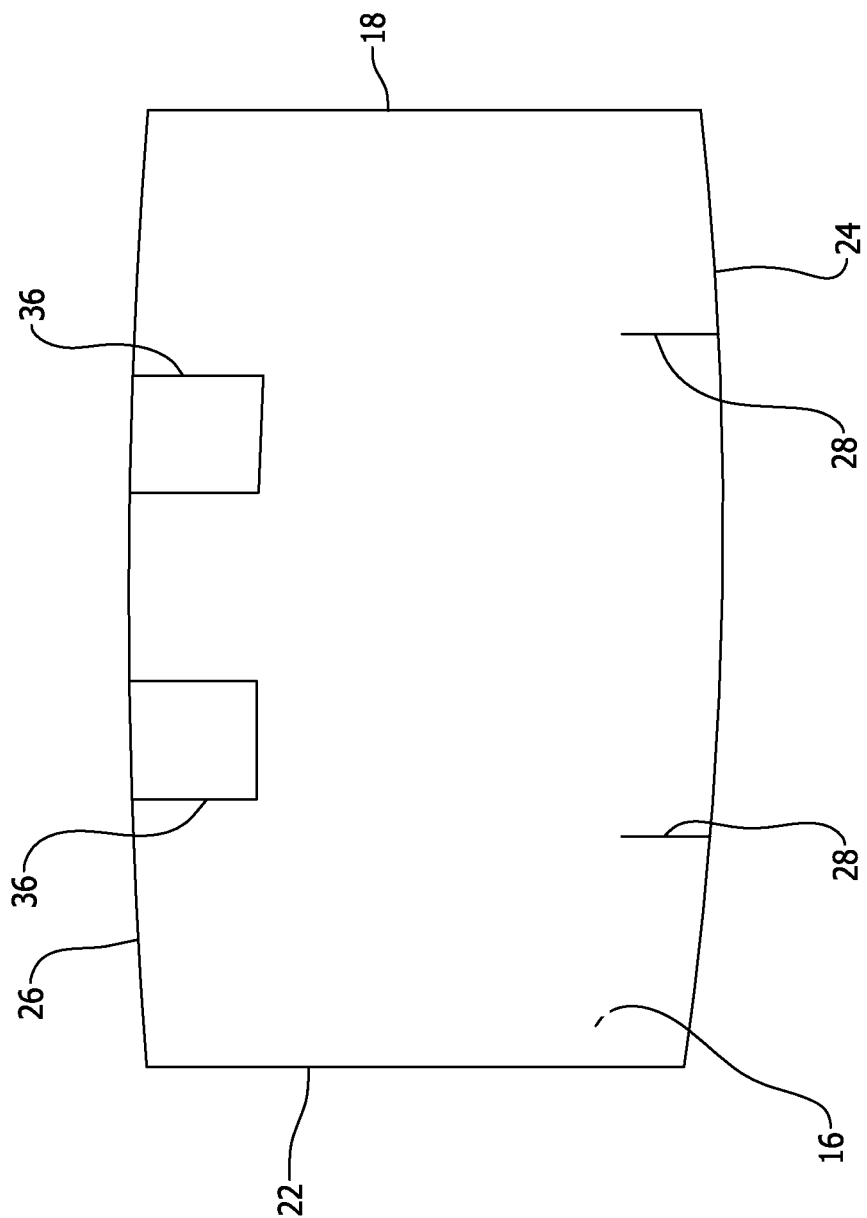
FIG. 2 is a schematic representation of a cross-section through a portion of the wing of FIG. 1 in a plane positioned along the line 2-2 of FIG. 1.
Figure 3:
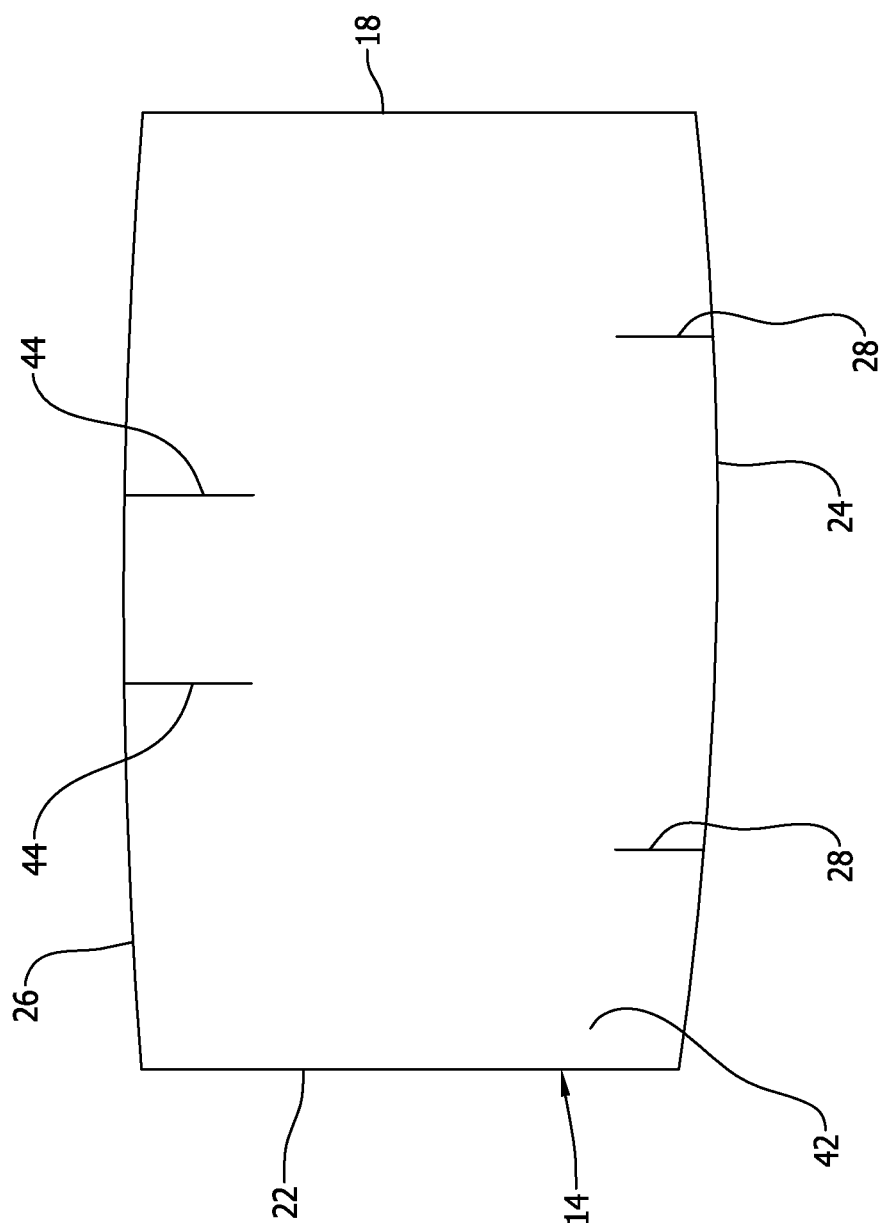
FIG. 3 is a schematic representation of a cross-section through a portion of the wing of FIG. 1 in a plane positioned along the line 3-3 of FIG. 1.

In the construction of the aircraft wing 12 represented schematically in FIGS. 1, 2 and 3, a wing box 14 is formed in the interior of the wing. A cross-section of the wing box 14 in a plane along the line 2-2 of FIG. 1 is represented in FIG. 2, and a cross-section of the wing box 14 in a plane along the line 3-3 of FIG. 1 is represented in FIG. 3.

Referring to FIG. 2, the interior of the wing box 14 includes a rib 16 that extends between a forward spar 18 and a rearward spar 22. The rib 16 is also connected to a skin panel 24 that forms a bottom, exterior surface of the wing 12 and a skin panel 26 that forms a top surface of the wing 12.

Figure 5:
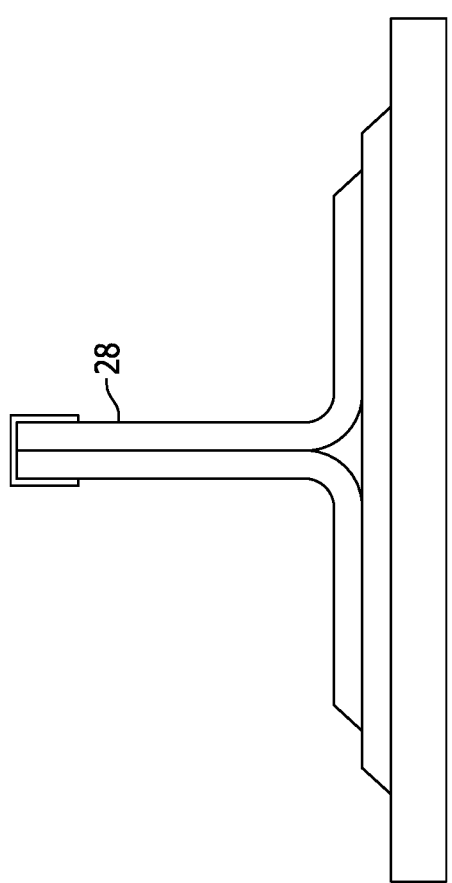
FIG. 5 is a representation of a cross-section through a blade stringer.

A pair of lower stringers 28 extend along the longitudinal length of the wing 12 from an inboard end 32 of the wing toward an outboard end 34 of the wing. As represented in FIG. 2, the lower stringers 28 have narrow cross-sectional areas and narrow lateral widths. An example of such a stringer 28 is a blade stringer. A schematic representation of a cross-section through a blade stringer 28 is shown in FIG. 5. The pair of lower stringers 28 are connected to the rib 16 represented in FIG. 2 and the interior surface of the lower skin panel 24 that forms the bottom surface of the wing 12.

Figure 4:
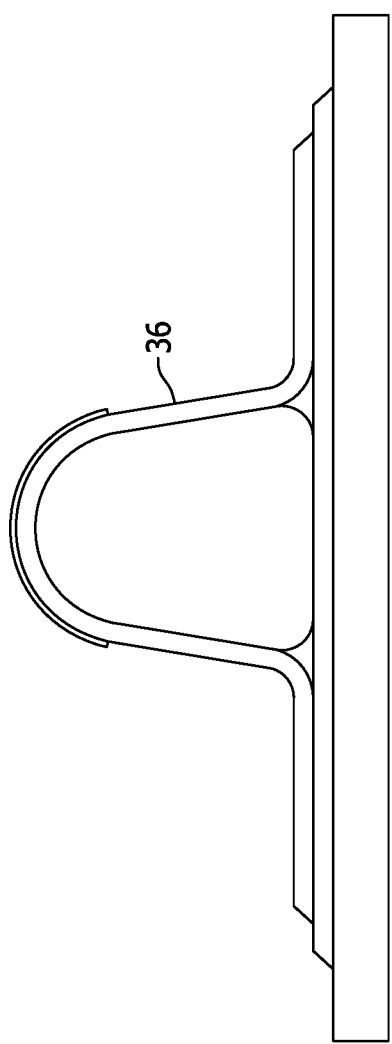
FIG. 4 is a representation of a cross-section through a small rounded hat stringer.

A pair of upper stringers 36 extend along a portion of the longitudinal length of the wing 12. The pair of upper stringers 36 have larger cross-sectional areas and larger lateral widths than the pair of lower stringers 28. An example of such a stringer 36 is a hat stringer. A schematic representation of a cross-section through a hat stringer 36 is shown in FIG. 4.

FIG. 3 is a schematic representation of a cross-section through the wing box 14 in a plane positioned along the line 3-3 of FIG. 1. In FIG. 3 an additional rib 42 is represented. The additional rib 42 is positioned along the longitudinal length of the wing box 14 toward the outboard end 34 of the wing box from the rib 16 represented in FIG. 2. The additional rib 42 also extends between the forward spar 18 and the rearward spar 22 of the wing box 14. The skin panel 24 that forms the bottom surface of the wing 14 is connected to a bottom edge of the additional rib 42, and the skin panel 26 that forms the top surface of the wing 12 is connected to the top edge of the additional rib 42. The pair of lower stringers 28 extend through the additional rib 42 and are connected to the additional rib 42 and the skin panel 24 that forms the bottom surface of the wing 12. A pair of upper stringers 44 also extend through the additional rib 42 and connect the additional rib 24 to the skin panel 26 that forms the top surface of the wing 12. However, as represented in FIG. 3, the upper stringers 44 have smaller cross-sectional areas and smaller lateral widths than the upper stringers 36 that extend through the rib 16 represented in FIG. 2. Thus, between the rib 16 of FIG. 2 and the additional rib 42 of FIG. 3, the upper stringers that extend along the longitudinal length of the wing 12 transition from the larger cross-sectional area stringers 36 and larger lateral width stringers 36 to the smaller cross-sectional area stringers 44 and smaller lateral width stringers 44.

To transfer loads between the upper stringers 36 that pass through the rib 16 of FIG. 2 to the upper stringers 44 that pass through the rib 42 of FIG. 3, without using the expensive titanium fittings and associated fasteners that add to the weight of the wing 12 and add to the manufacturing time and cost of the wing 12, the stringer transition through a common base of this disclosure is employed.

The method of constructing the aircraft structure having the stringer transition through a common base is represented in FIGS. 6-14. The aircraft structure, or aircraft wing 12 is constructed employing a conventional vacuum bagging process on an outside mold line (OML) layup mandrel 46 represented schematically in FIGS. 6-10.

Figure 6:
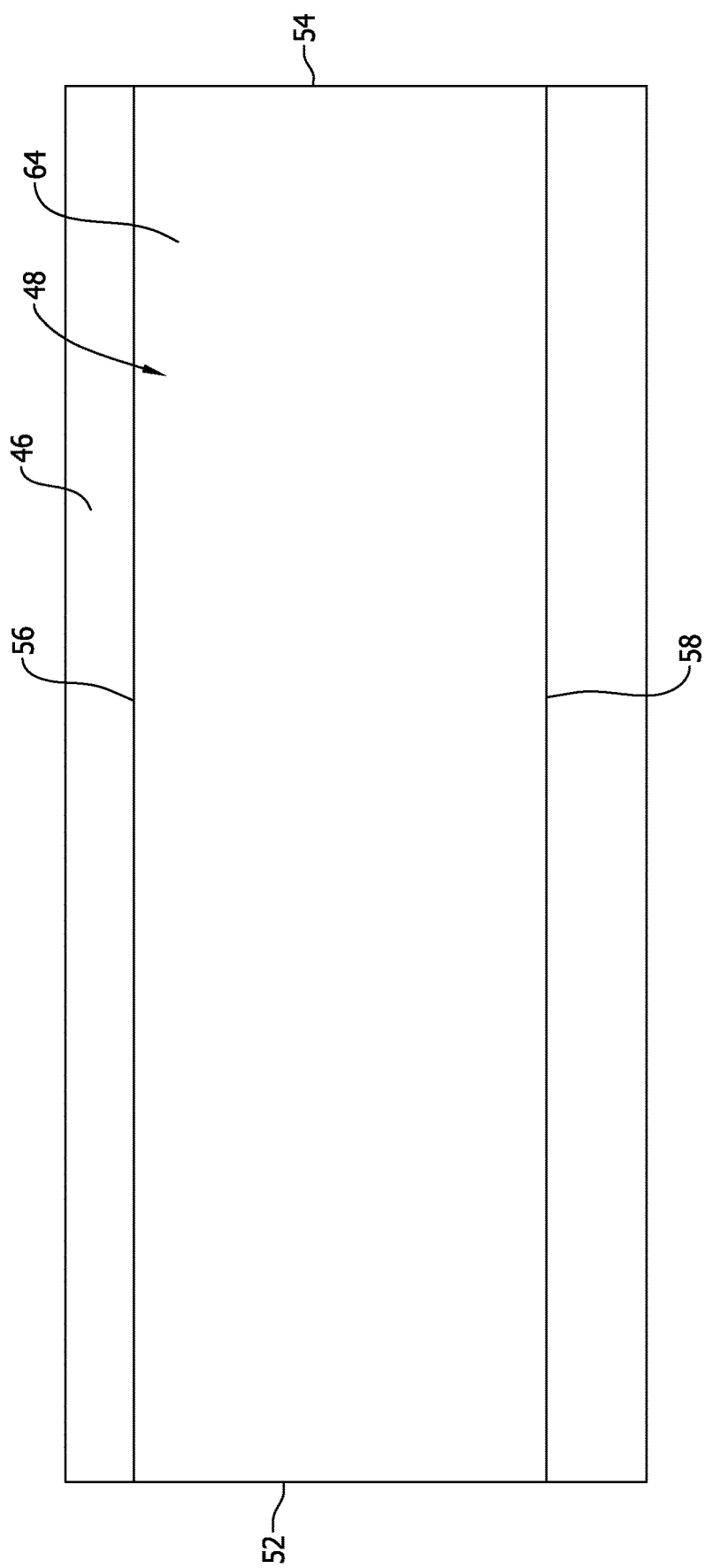
FIG. 6 is a representation of a plan view of a first step in the construction of the stringer transition through a common base charge.

Referring to FIG. 6, skin plys of composite material that form a skin panel 48 of the wing 12 are laid up on the mandrel 46. The skin plys that form the skin panel 48 can be any combination of pre-preg fabric and tape that are needed to provide the skin panel 48 with a configuration needed to form the wing 12 and provide the wing 12 with sufficient structural strength. The skin panel 48 has a longitudinal length that extends between an inboard edge 52 of the skin panel and an opposite outboard edge 54 of the skin panel. The skin panel 48 has a lateral width that extends between a forward edge 56 of the skin panel and an opposite rearward edge 58 of the skin panel. The skin plys that form the skin panel 48 give the skin panel a thickness between an exterior surface 62 of the skin panel and an opposite interior surface 64 of the skin panel. The exterior surface 62 of the skin panel forms an exterior surface of the wing 12 that is exposed to the exterior environment of the wing. The exterior surface 62 of the skin panel 48 could be a top surface of the wing 12 or a bottom surface of the wing. The interior surface 64 of the skin panel 48 faces toward the interior of the wing 12 and forms a portion of the wing box 14.

Figure 7:
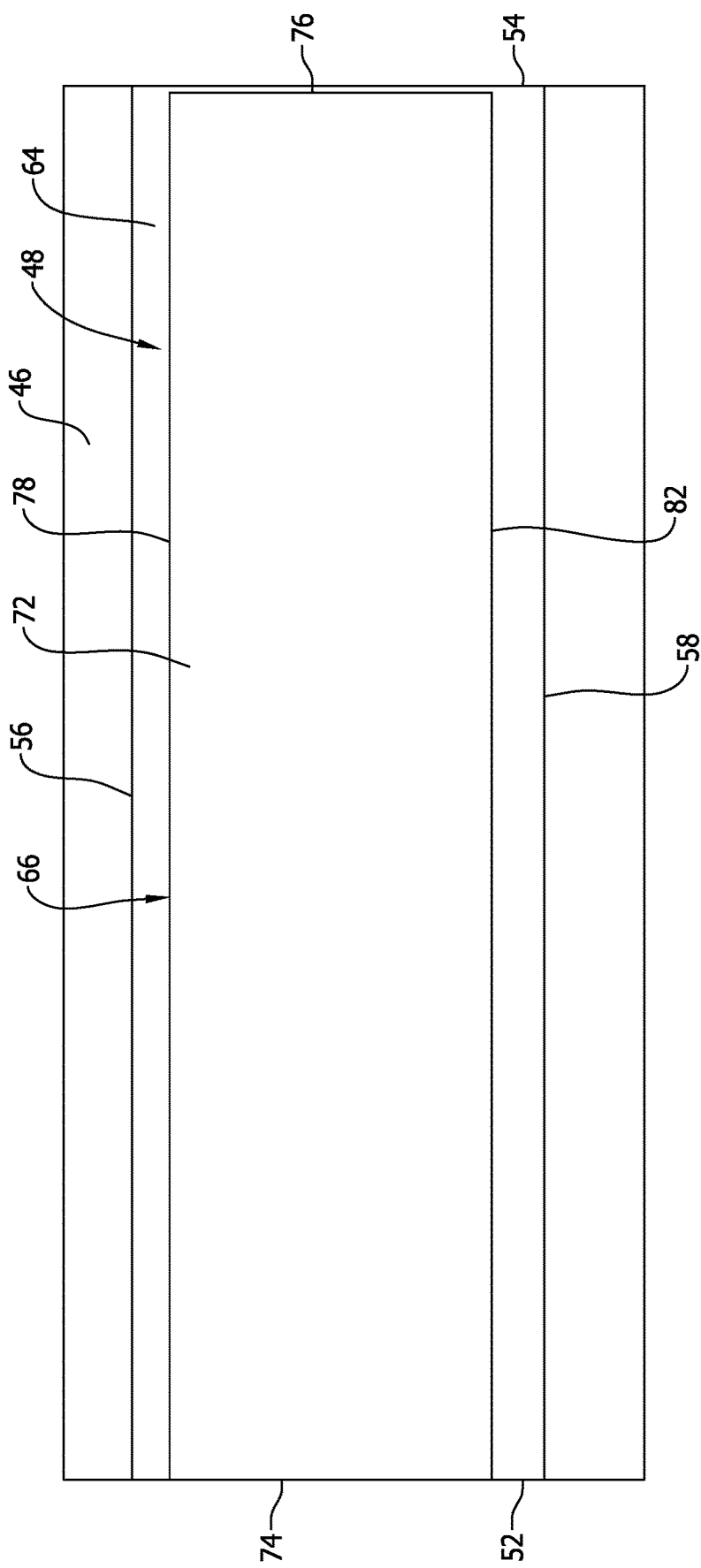
FIG. 7 is a representation of a plan view of a further step in the construction of the stringer transition through a common base charge.

A base 66, comprised of plys of composite material, is laid up on the interior surface 64 of the skin panel 48 as represented in FIG. 7. In FIG. 7, the base 66 is represented as having an elongate, generally rectangular and generally planar configuration. However, the configuration of the base 66 can be altered to best suit the base 66 to the configuration of the wing 12 being constructed. The base 66 has an exterior surface 68 that is laid up on the interior surface 64 of the skin panel 48, and an opposite interior surface 72. The interior surface 72 of the base 66 faces into the wing box 14 of the wing 12. The base 66 has a longitudinal length that extends between an inboard edge 74 of the base and an opposite outboard edge 76 of the base. The longitudinal length of the base 66 is determined to provide the base 66 with a sufficient longitudinal length to extend along the stringers employed in the construction of the wing box 14 of the wing 12, as will be described. The longitudinal length of the base 66 could be the same longitudinal length of the skin panel 48. The base 66 has a lateral width that extends between a forward edge 78 of the base and an opposite rearward edge 82 of the base. The lateral width of the base 66 is determined to be larger than the lateral widths of the stringers that are employed with the base 66, as will be described.

Figure 8:
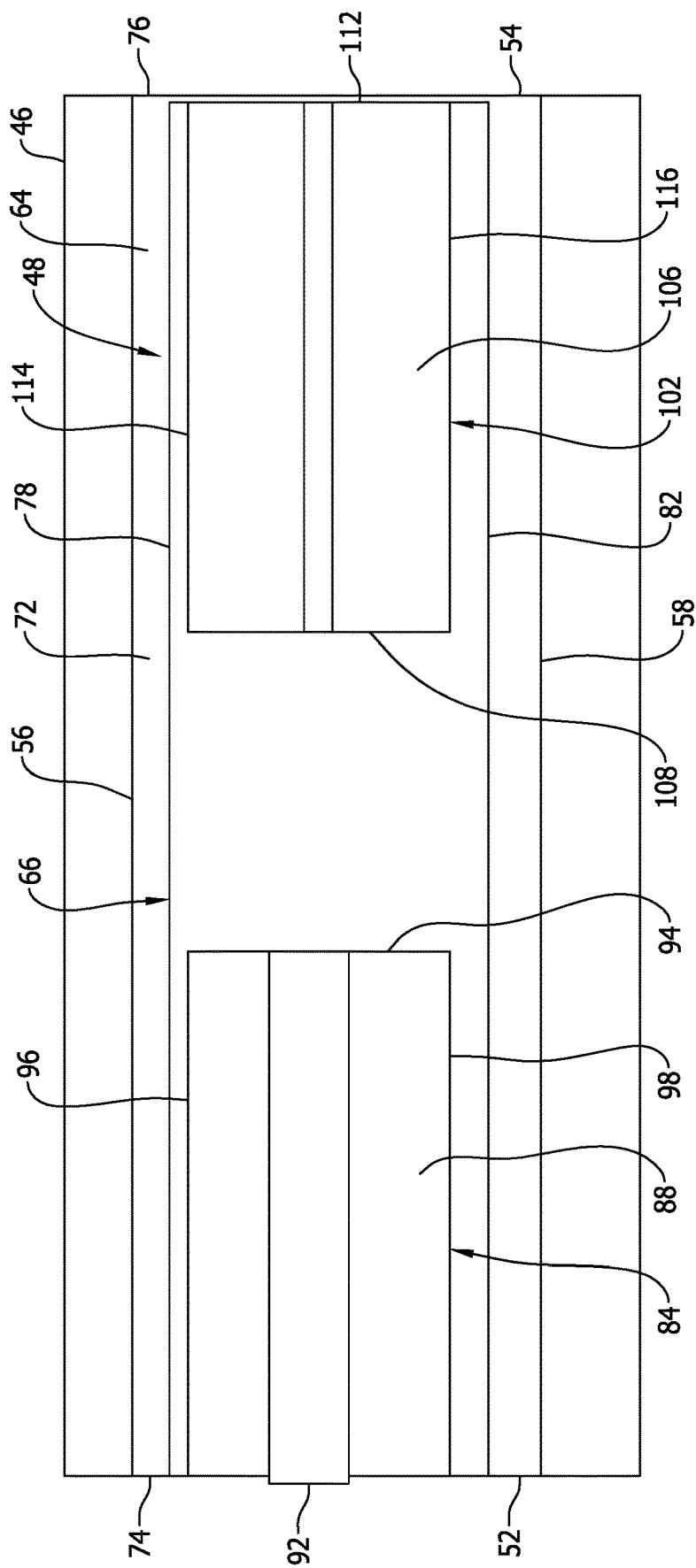
FIG. 8 is a representation of a plan view of a further step in the construction of the stringer transition through a common base charge.

A first stringer 84, comprised of composite material, having a first cross-sectional area, a first lateral width, and a first cross-section configuration, for example a hat stringer is laid up on the interior surface 72 of the base 66. The first stringer 84 has an exterior surface 86 and an opposite interior surface 88. The exterior surface 86 of the first stringer 84 is laid up on the interior surface 72 of the base 66. The interior surface 88 of the first stringer 84 faces toward the interior of the wing box 14 of the wing 12. The first stringer 84 has a longitudinal length that extends between an inboard end 92 of the first stringer 84 and an opposite outboard end 94 of the first stringer. The first stringer 84 has a lateral width between forward edge 96 of the first stringer and an opposite rearward edge 98 of the first stringer. As represented in FIG. 8, the lateral width of the first stringer 84 is slightly smaller than the lateral width of the base 66. Also represented in FIG. 8, the longitudinal length of the first stringer 88 extends from the inboard end 92 of the first stringer that is positioned substantially at the inboard edge 74 of the base 66. From the inboard end 92 of the first stringer 84, the longitudinal length of the first stringer 84 is aligned with and extends along a portion of the longitudinal length of the base 66.

Also represented in FIG. 8 is a second stringer 102, comprised of composite material, that is laid up on the base 66. The second stringer 102 has a second cross-section configuration, for example a blade stringer, and has a second cross-sectional area and a second lateral width that are smaller than the cross-sectional area and lateral width of the first stringer 84. This reduction in the cross-sectional area and lateral width of the second stringer 102 enables the second stringer 102 to extend further along the longitudinal length of the wing box 14 than would be possible with the first stringer 84, due to the decreasing interior area of the wing box 14 as it extends from the inboard end 32 of the wing 12 toward the outboard end 34 of the wing 12. The second stringer 102 has an exterior surface 104 and an opposite interior surface 106. The second stringer 102 also has a longitudinal length that extends between an inboard end 108 of the second stringer 102 and an opposite outboard end 112 of the second stringer 102. The exterior surface 104 of the second stringer 102 is laid up on the interior surface 72 of the base 66 with the longitudinal length of the second stringer 102 aligned with the longitudinal length of the first stringer 84, and with the longitudinal length of the second stringer 102 aligned with and extending along a portion of the longitudinal length of the base 66. As represented in FIG. 8, the inboard end 108 of the second stringer 102 opposes and is longitudinally spaced from the outboard end 94 of the first stringer 84. The second stringer 102 also has a lateral width that extends between a forward edge 114 of the second stringer 102 and an opposite rearward edge 116 of the second stringer 102. As represented in FIG. 8, the lateral width of the second stringer 102 between the forward edge 114 and the rearward edge 116 is slightly smaller than the lateral width of the base 66 between the forward edge 78 of the base 66 and the rearward edge 82 of the base 66.

Figure 9:
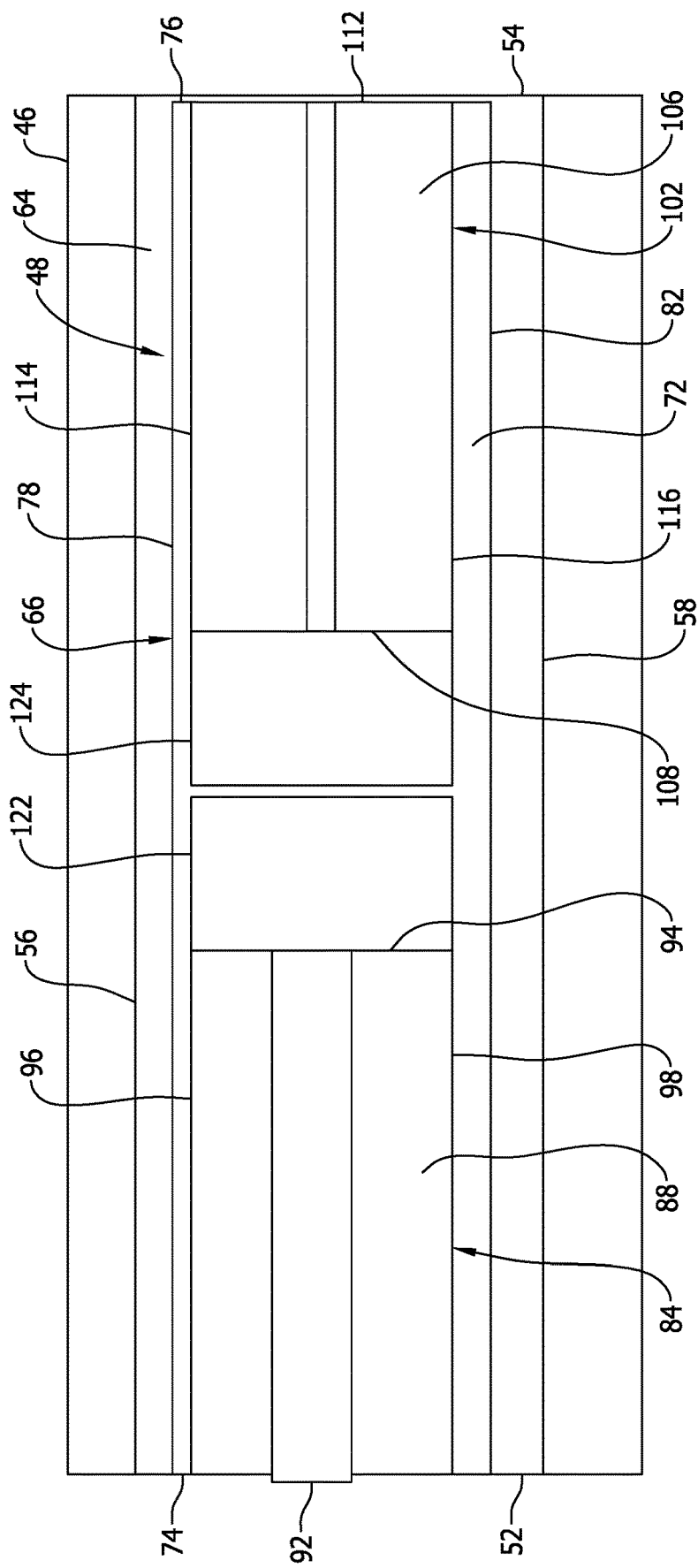
FIG. 9 is a representation of a plan view of a further step in the construction of the stringer transition through a common base charge.
Figure 10:
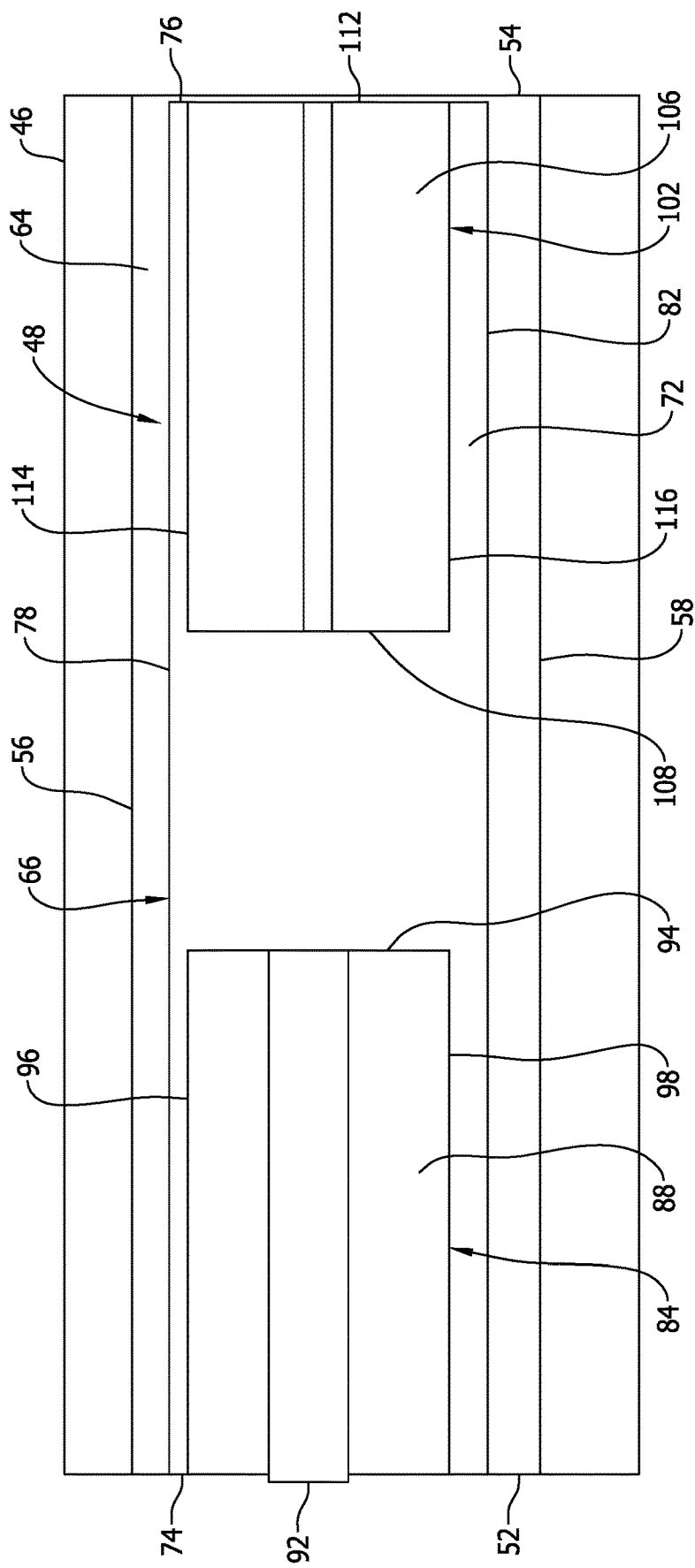
FIG. 10 is a representation of a plan view of a further step in the construction of the stringer transition through a common base charge.

Prior to the skin panel 48, the base 66, the first stringer 84 and the second stringer 102 being formed as a single, monolithic piece by vacuum bagging, runout cauls 122, 124 are positioned on the interior surface 72 of the base 66 between the outboard end 94 of the first stringer 84 and the inboard end of the 108 of the second stringer 102. This is represented in FIG. 9. The cauls 122, 124 transmit the pressure or force created by a vacuum bag to the interior surface 72 of the base 66. The cauls 122, 124 thereby compress the base 66 against the skin panel 48.

With the cauls 122, 124 in place, a vacuum bag is positioned over the skin panel 48, the base 66, the first stringer 84 and the second stringer 102 and is sealed to the layup mandrel 46. The air between the vacuum bag and the mandrel 46 is extracted by a pump, causing the vacuum bag to be drawn down on the first stringer 84, the second stringer 102 and the pair of cauls 122, 124. This compresses the first stringer 84 and the second stringer 102 downward on to the base 66, and compresses the base 66 downward onto the skin panel 48. The skin panel 48, the base 66, the first stringer 84 and the second stringer 102 are then cured in an autoclave, forming the skin panel 48, the base 66, the first stringer 84 and the second stringer 102 as a single, monolithic fiber reinforced composite part. The vacuum bag is then removed, the cauls 122, 124 are removed and the monolithic skin panel 48, base 66, first stringer 84 and second stringer 102 are removed from the layup mandrel 46.

Figure 11:
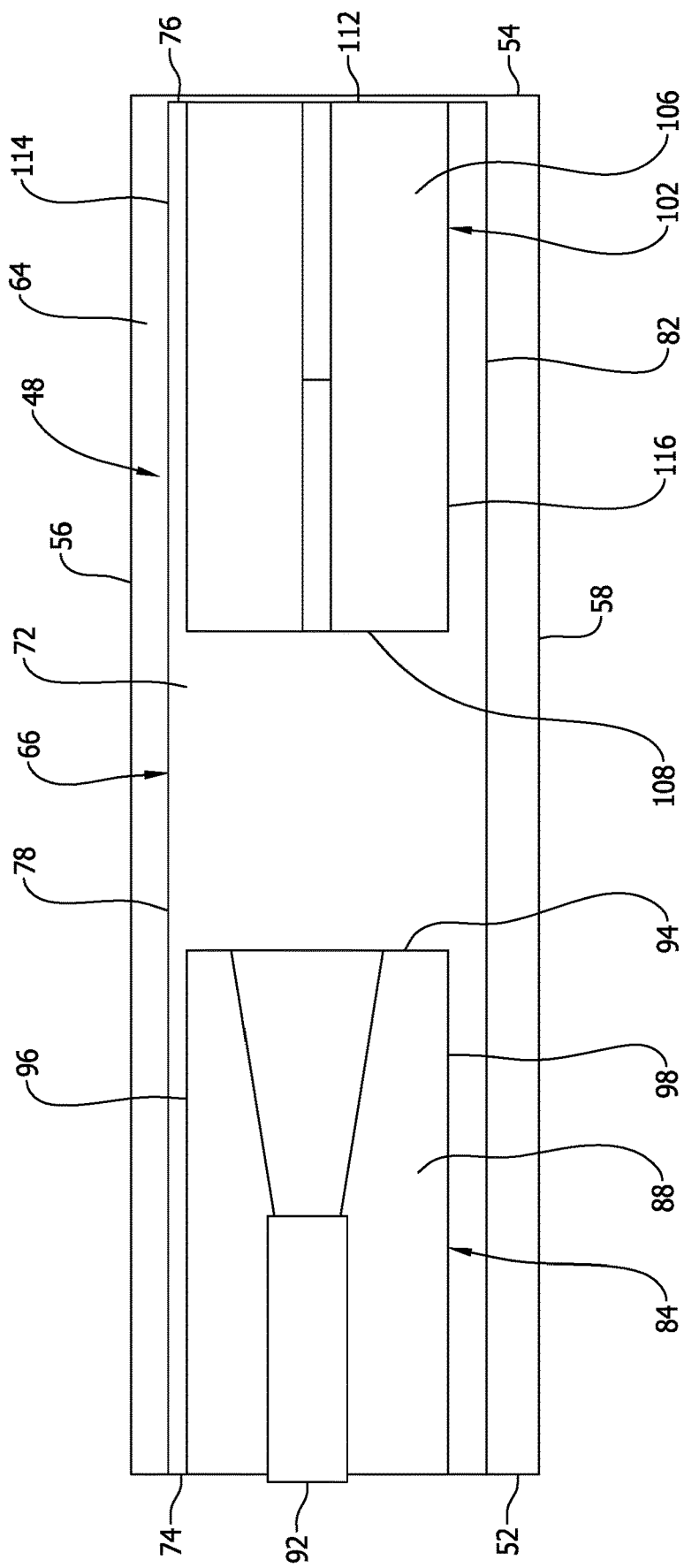
FIG. 11 is a representation of a plan view of a further step in the construction of the stringer transition through a common base charge.
Figure 12:
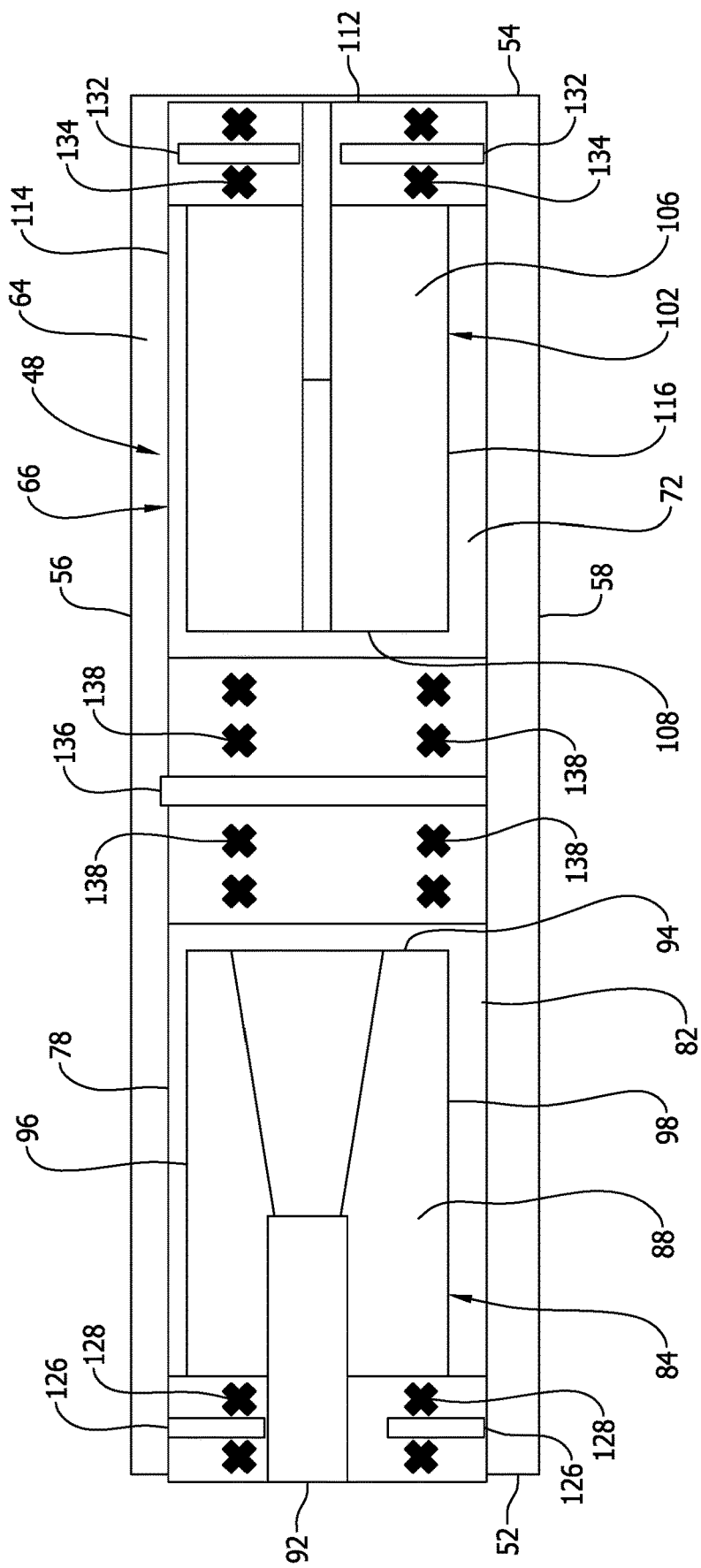
FIG. 12 is a representation of a plan view of a further step in the construction of the stringer transition through a common base charge.
Figure 13:
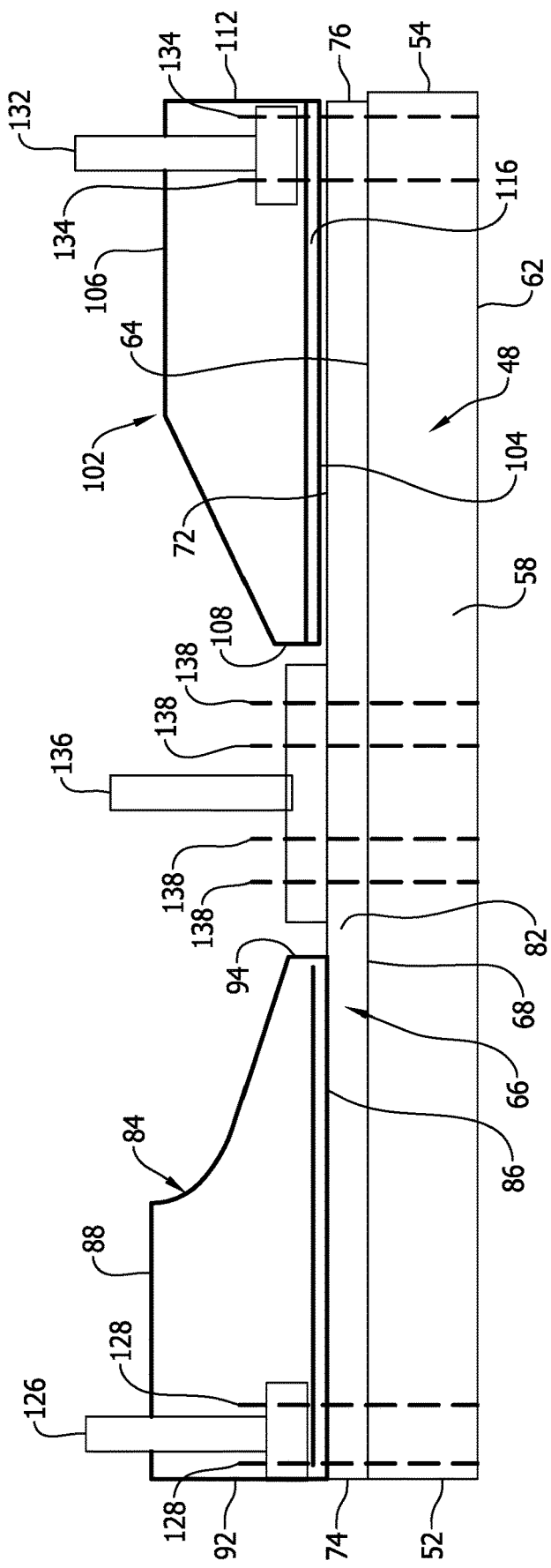
FIG. 13 is a representation of an elevation view of the stringer transition through a common base charge.
Figure 14:
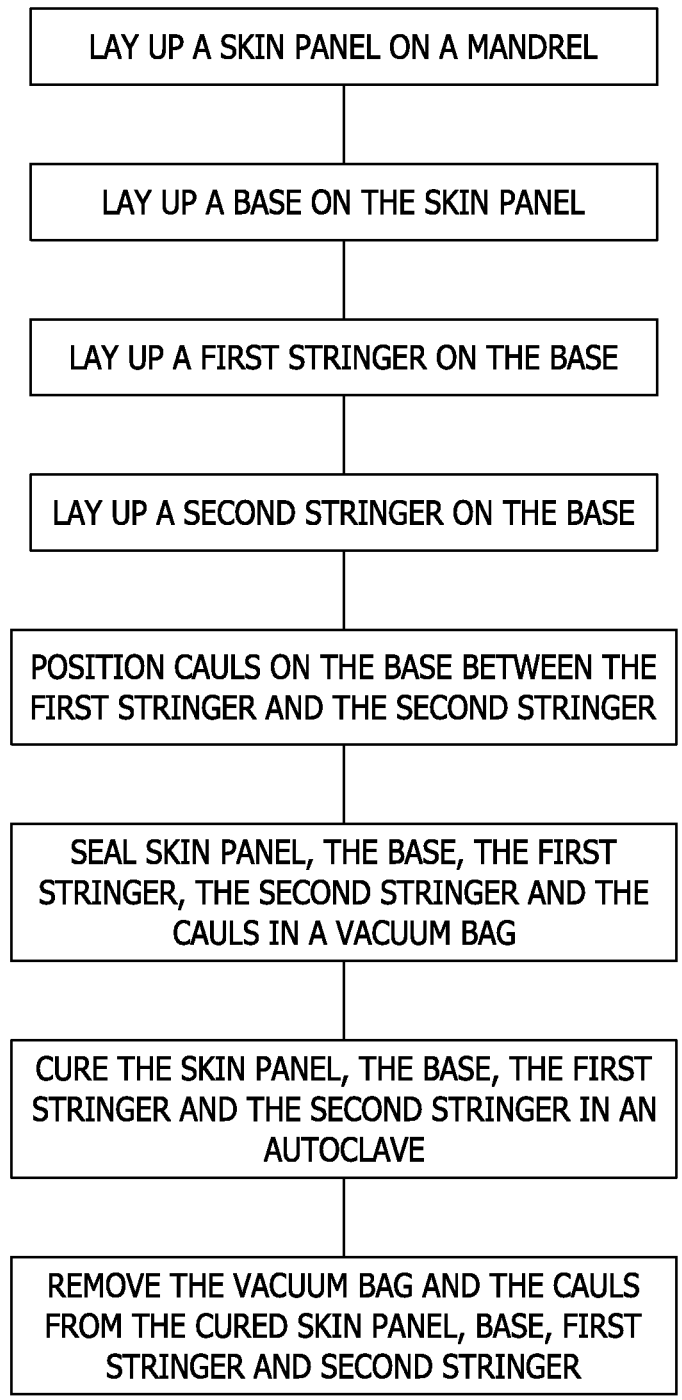
FIG. 14 is a flow chart representation of the method of constructing the stringer transition through a common base charge.

Following curing, portions of the outboard end 94 of the first stringer 84 and the outboard end 112 of the second stringer 102 can be trimmed. Examples of the trimmed configurations of the outboard end 94 of the first stringer 84 and the inboard end 108 of the second stringer 102 are represented in FIGS. 11-13. Trimming of the outboard end 94 of the first stringer 84 and the inboard end 108 of the second stringer 102 is done to minimize loads at the opposing ends of the stringers that could cause delamination of the plys of the stringers.

After the skin panel 48, the base 66, the first stringer 84 and the second stringer 102 have been constructed together as a single, monolithic piece, ribs can be attached to the skin panel 48 and base 66. This is represented in FIGS. 12 and 13. As represented in FIGS. 12 and 13, a first rib 126 is installed to the skin panel 48, the base 66 and the first stringer 84 by first fasteners 128. A second rib 132 is installed to the skin panel 48, the base 66 and the second stringer 102 by second fasteners 134. A third rib 136 is installed by third fasteners 138 to the skin panel 48 and the base 66 between the first stringer 84 and the second stringer 102. The base 66 extends under all of the ribs 126, 132, 136 and is common to both of the stringers 84, 102.

Although the stringer transition through the common base 66 is described above with only one base 66 extending along the longitudinal length of the skin panel 48 and one first stringer 84 and one second stringer 102 extending along the longitudinal length of the base, it should be understood that the aircraft wing would likely be constructed with multiple pairs of stringers with each pair of stringer having a common base, with the pairs of stringers and their common base extending longitudinally along the length of the aircraft wing, and the pairs of stringers and their common base being laterally spaced across the lateral width of the wing.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An aircraft structure comprising:
a base, the base having an exterior surface and an opposite interior surface, the base having a longitudinal length between an inboard edge of the base and an opposite outboard edge of the base;
a first stringer, the first stringer having an exterior surface and an opposite interior surface, the first stringer having a longitudinal length between an inboard end of the first stringer and an opposite outboard end of the first stringer, the exterior surface of the first stringer is secured to the interior surface of the base with the longitudinal length of the first stringer aligned with and extending along the longitudinal length of the base;
a second stringer, the second stringer having an exterior surface and an opposite interior surface, the second stringer having a longitudinal length between an inboard end of the second stringer and an opposite outboard end of the second stringer, the exterior surface of the second stringer is secured to the interior surface of the base with the longitudinal length of the second stringer aligned with the longitudinal length of the first stringer and with the longitudinal length of the second stringer aligned with and extending along the longitudinal length of the base;
the first stringer is longitudinally spaced from the second stringer; and,
the base connects the first stringer to the second stringer and only the base connects the first stringer to the second stringer.

2. The aircraft structure of claim 1, further comprising:
the first stringer has a first cross-section configuration;
the second stringer has a second cross-section configuration; and,
the first cross-section configuration and the second cross-section configuration are different configurations.

3. The aircraft structure of claim 2, further comprising:
the first cross-section configuration of the first stringer is a hat stringer cross-section configuration; and,
the second cross-section configuration of the second stringer is a blade stringer cross-section configuration.

4. The aircraft structure of claim 1, further comprising:
a skin panel, the skin panel having an exterior surface and an opposite interior surface, the skin panel having a longitudinal length between an inboard edge of the skin panel and an opposite outboard edge of the skin panel, the skin panel having a lateral width between a forward edge of the skin panel and an opposite rearward edge of the skin panel;
the base having a lateral width between a forward edge of the base and an opposite rearward edge of the base, the exterior surface of the base is secured to the interior surface of the skin panel with the longitudinal length of the base aligned with and extending along the longitudinal length of the skin panel; and,
the lateral width of the base is smaller than the lateral width of the skin panel.

5. The aircraft structure of claim 4, further comprising:
the first stringer having a lateral width between a forward edge of the first stringer and an opposite rearward edge of the first stringer;
the second stringer having a lateral width between a forward edge of the second stringer and an opposite rearward edge of the second stringer; and,
the lateral width of the first stringer is smaller than the lateral width of the base.

6. The aircraft structure of claim 5, further comprising:
the lateral width of the second stringer is smaller than the lateral width of the base.

7. The aircraft structure of claim 1, further comprising:
a first rib extends laterally across the first stringer;
a second rib extends laterally across the second stringer; and,
a single rib extends laterally between the first stringer and the second stringer.

8. The aircraft structure of claim 7, further comprising:
a first plurality of fasteners connect the first rib to the base;
a second plurality of fasteners connect the second rib to the base; and, a third plurality of fasteners connect the single rib to the base.

9. The aircraft structure of claim 4, further comprising:
the exterior surface of the skin panel is an exterior surface of an aircraft wing.

10. An aircraft structure comprising:
a base constructed of composite material, the base having an exterior surface and an opposite interior surface, the base having a longitudinal length between an inboard edge of the base and an opposite outboard edge of the base,
a first stringer constructed of composite material, the first stringer having an exterior surface and an opposite interior surface, the first stringer having a longitudinal length between an inboard end of the first stringer and an opposite outboard end of the first stringer, the exterior surface of the first stringer is secured to the interior surface of the base with the longitudinal length of the first stringer aligned with and extending along the longitudinal length of the base;
a second stringer constructed of composite material, the second stringer having an exterior surface and an opposite interior surface, the second stringer having a longitudinal length between an inboard end of the second stringer and an opposite outboard end of the second stringer, the exterior surface of the second stringer is secured to the interior surface of the base with the longitudinal length of the second stringer aligned with the longitudinal length of the first stringer and with the longitudinal length of the second stringer aligned with and extending along the longitudinal length of the base;
the outboard end of the first stringer is longitudinally spaced from the inboard end of the second stringer;
the base connects the exterior surface of the first stringer to the exterior surface of the second stringer and thereby connects the first stringer and the second stringer; and,
only the base connects the first stringer and the second stringer.

11. The aircraft structure of claim 10, further comprising:
the first stringer having a lateral width between a forward edge of the first stringer and an opposite rearward edge of the first stringer;
the second stringer having a lateral width between a forward edge of the second stringer and an opposite rearward edge of the second stringer; and,
the lateral width of the first stringer and the lateral width of the second stringer are different.

12. The aircraft structure of claim 10, further comprising:
the first stringer has a cross-section configuration of a hat stringer; and,
the second stringer has a cross-section configuration of a blade stringer.

13. The aircraft structure of claim 10, further comprising:
a skin panel constructed of composite material, the skin panel having an exterior surface and an opposite interior surface, the skin panel having a longitudinal length between an inboard edge of the skin panel and an opposite outboard edge of the skin panel, the skin panel having a lateral width between a forward edge of the skin panel and an opposite rearward edge of the skin panel;
the base having a lateral width between a forward edge of the base and an opposite rearward edge of the base, the exterior surface of the base is secured to the interior surface of the skin panel with the longitudinal length of the base aligned with and extending along the longitudinal length of the skin panel; and,
the lateral width of the skin panel is larger than the lateral width of the base.

14. The aircraft structure of claim 13, further comprising:
the first stringer having a lateral width between a forward edge of the first stringer and an opposite rearward edge of the first stringer;
the second stringer having a lateral width between a forward edge of the second stringer and an opposite rearward edge of the second stringer; and,
the lateral width of the base is larger than the lateral width of the first stringer.

15. The aircraft structure of claim 14, further comprising:
the lateral width of the base is larger than the lateral width of the second stringer.

16. The aircraft structure of claim 10, further comprising:
a first rib extends laterally across the first stringer and laterally across the base;
a second rib extends laterally across the second stringer and laterally across the base; and,
a single rib extends laterally between the first stringer and the second stringer and laterally across the base.

17. The aircraft structure of claim 16, further comprising:
a first plurality of fasteners extend through the base and the first rib, the first plurality of fasteners connect the first rib to the base;
a second plurality of fasteners extend through the base and the second rib, the second plurality of fasteners connect the second rib to the base; and,
a third plurality of fasteners extend through the base and the single rib, the third plurality of fasteners connect the single rib to the base.

18. The aircraft structure of claim 13, further comprising:
the exterior surface of the skin panel is an exterior surface of an aircraft wing.

19. A method of constructing an aircraft structure, the method comprising:
laying down a base on an outer mold line mandrel, the base having an exterior surface and an opposite interior surface with the exterior surface of the base being laid on the outer mold line mandrel, the basing having a longitudinal length between an inboard edge of the base and an, opposite outboard edge of the base;
laying down a hat stringer on the base, the hat stringer having an exterior surface and an opposite interior surface, the hat stringer having a longitudinal length between an inboard end of the hat stringer and an opposite outboard end of the hat stringer, the exterior surface of the hat stringer being laid down and secured to the interior surface of the base with the longitudinal length of the hat stringer aligned with and extending along the longitudinal length of the base;
laying down a blade stringer on the base with the blade stringer aligned with and spaced from the hat stringer, the blade stringer having, an exterior surface and an opposite interior surface, the blade stringer having a longitudinal length between an inboard end of the blade stringer and an opposite outboard end of the blade stringer, the exterior surface of the blade stringer being laid down on and secured to the interior surface of the base with the longitudinal length of the blade stringer aligned with the longitudinal length of the hat stringer and with the longitudinal length of the blade stringer aligned and extending along the longitudinal length of the base;

spacing the hat stringer longitudinally from the blade stringer;
the base connecting the hat stringer to the blade stringer and only the base connecting the hat stringer to the blade stringer;
positioning a vacuum bag over the base, the hat stringer and the blade stringer;
curing the base, the hat stringer and the blade stringer in an autoclave;
removing the vacuum bag from the base, hat stringer and blade stringer; and,
installing ribs on the base.

20. The method of claim 19, further comprising:
prior to laying down the base on the outer mold line mandrel, laying down a skin panel on the outer mold line mandrel; then,
laying down the base on the skin panel.

\* \* \* \* \*